(12) United States Patent
Lin et al.

(10) Patent No.: US 9,256,443 B2
(45) Date of Patent: Feb. 9, 2016

(54) ELECTRONIC DEVICE HAVING UPDATABLE BIOS AND BIOS UPDATING METHOD THEREOF

(71) Applicant: GIGA-BYTE TECHNOLOGY CO., LTD., New Taipei (TW)

(72) Inventors: Hou Yuan Lin, New Taipei (TW); Wei Wen Tseng, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 92 days.

(21) Appl. No.: 13/772,341

(22) Filed: Feb. 21, 2013

(65) Prior Publication Data

US 2014/0189337 A1 Jul. 3, 2014

(30) Foreign Application Priority Data

Dec. 27, 2012 (TW) .............................. 101150650 A

(51) Int. Cl.
*G06F 9/44* (2006.01)
*G06F 9/445* (2006.01)
*G06F 13/40* (2006.01)
*H04N 21/443* (2011.01)

(52) U.S. Cl.
CPC ................ *G06F 9/4418* (2013.01); *G06F 8/65* (2013.01); *G06F 13/4022* (2013.01); *H04N 21/4436* (2013.01)

(58) Field of Classification Search
CPC ........... G06F 8/61–8/65; G06F 9/4418; G06F 13/4022; H04N 21/4436
See application file for complete search history.

(56) References Cited

U.S. PATENT DOCUMENTS

| 8,386,842 | B2 * | 2/2013 | Lin ............................... 714/6.31 |
| 2006/0200813 | A1 | 9/2006 | Young et al. |
| 2006/0225067 | A1 * | 10/2006 | Yang .......................... G06F 8/65 717/168 |
| 2007/0055860 | A1 * | 3/2007 | Wang ..................... G06F 1/3203 713/2 |
| 2007/0220282 | A1 * | 9/2007 | Huang ........................... 713/300 |
| 2007/0288737 | A1 * | 12/2007 | Boyle ....................... G06F 8/65 713/1 |

(Continued)

FOREIGN PATENT DOCUMENTS

| CN | 1170220 C | 10/2004 |
| CN | E100561436 C | 11/2009 |

(Continued)

OTHER PUBLICATIONS

Vincent Lee, Project Bios Documentation EECS Fall 2012, pp. 1-5.*

(Continued)

*Primary Examiner* — Thuy Dao
*Assistant Examiner* — Mongbao Nguyen
(74) *Attorney, Agent, or Firm* — Chuh-Ming Shih

(57) ABSTRACT

An electronic device having updatable BIOS is used to perform a BIOS updating method. The electronic device electrically connects to a server, in which update data is stored. The electronic device includes a Basic Input/Output System (BIOS), a network connection module and a switch. A BIOS program is stored in the BIOS, and a connecting program is stored in the network connection module for connecting to the server. When the electronic device is updating, the BIOS switches to electrically connect to the network connection module via the switch, and the network connection module connects to the server by executing the connecting program, downloads the update data applying to the BIOS, and overwrites the update data to the BIOS to update the BIOS program.

6 Claims, 7 Drawing Sheets

(56) References Cited

U.S. PATENT DOCUMENTS

| | | | | |
|---|---|---|---|---|
| 2008/0301427 A1* | 12/2008 | Zhao | ............... | G06F 11/3664 713/2 |
| 2009/0006836 A1* | 1/2009 | Takeda | ............... | G06F 8/65 713/2 |
| 2009/0235246 A1* | 9/2009 | Seal et al. | ............... | 717/173 |
| 2009/0276512 A1* | 11/2009 | Holdaway et al. | ............... | 709/223 |
| 2009/0300395 A1* | 12/2009 | Chin et al. | ............... | 713/324 |
| 2009/0320018 A1* | 12/2009 | Kallianpur | ............... | G06F 8/63 717/177 |
| 2010/0049961 A1* | 2/2010 | Liao | ............... | G06F 11/1433 713/2 |
| 2010/0099432 A1* | 4/2010 | Glover et al. | ............... | 455/456.1 |
| 2010/0169629 A1* | 7/2010 | Zhang et al. | ............... | 713/1 |
| 2010/0299560 A1* | 11/2010 | Lin | ............... | 714/15 |
| 2011/0016297 A1* | 1/2011 | Merizan | ............... | G06F 8/65 713/1 |
| 2011/0119474 A1* | 5/2011 | Singh | ............... | G06F 8/65 713/2 |
| 2011/0179211 A1* | 7/2011 | Li | ............... | G06F 8/65 710/306 |
| 2012/0239920 A1* | 9/2012 | Yang | ............... | G06F 8/65 713/2 |
| 2013/0031538 A1* | 1/2013 | Skalsky | ............... | G06F 8/665 717/168 |
| 2013/0138940 A1* | 5/2013 | Wang | ............... | 713/2 |
| 2013/0346735 A1* | 12/2013 | Lynch | ............... | G06F 13/36 713/2 |

FOREIGN PATENT DOCUMENTS

| | | |
|---|---|---|
| JP | 2001067229 A | 3/2001 |
| JP | 2005258996 A | 9/2005 |
| JP | 20109474 A | 1/2010 |

OTHER PUBLICATIONS

Jerry Jex, Flash Memory Bios for PC and Notebook computers, 1991, pp. 1-4.*

William A. Arbaugh, A Secure and Reliable Bootstrap Architecture, 1996, pp. 4-10.*

* cited by examiner

ELECTRONIC DEVICE HAVING UPDATABLE BIOS AND BIOS UPDATING METHOD THEREOF

CROSS-REFERENCES TO RELATED APPLICATIONS

This non-provisional application claims priority under 35 U.S.C. §119(a) on Patent Application No. 101150650 filed in Taiwan, R.O.C. on 2012 Dec. 27, the entire contents of which are hereby incorporated by reference.

BACKGROUND

1. Technical Field

This disclosure relates to an electronic device having updatable BIOS and BIOS updating method thereof, and more particular, to an electronic device having updatable BIOS and BIOS updating method thereof which can be operated in different system modes.

2. Related Art

In an electronic system, the Basic Input/Output System (BIOS) is an indispensable firmware. The BIOS stores the basic code in the electronic system, any loaded hardware will be connected or probed by the BIOS. Besides, the BIOS is stored in read-only memory (ROM), so that the code stored in the BIOS will not disappear when the system is turned off. When the electronic device starts up, the code in the BIOS is loaded at first to initial basic hardware.

Take a general system boot process in the computer system as an illustration. When the power of the computer starts up, the controller chip on the motherboard first starts the BIOS to run Power-On Self Test (POST) process and to identify essential devices in the electronic system in sequence, such as memory, video card, hard disk drives, CD-ROM, serial port, parallel port, and floppy disk drive exist and work normally. After ensuring these devices in the computer well-functioned, the BIOS, in accordance with the path of the local user default profile, loads the system files stored in the hard disk or floppy disk drive to start the operating system program, completing the boot process.

As described above, the code stored in the BIOS is necessary for the electronic device. The data corruption in the BIOS due to viruses or error procedures will lead to the result that the electronic devices can not load essential devices into the system through the BIOS, hence causing the boot process abnormal. In addition, sometimes replacement or CPU on the motherboard of the electronic device has to accompany with updating for the code in the BIOS, or the electronic device will not boot up properly due to unsupported CPU. At that time, the electronic device must be returned to the factory for repair, which is very complex and time-consuming, troubling the users.

Besides, when CPU or other device on the motherboard of the electronic device is changed, the code in the BIOS has to be updated correspondingly. For different functions of the electronic device, the code in the BIOS must be updated correspondingly as well. Thus, the BIOS must be updated periodically.

Usually, the BIOS can be updated only when the electronic device is in the boot stage. Meanwhile, a removable storage device (such as a floppy disk or an external USB drive) is required for pre-downloading and storing the update data for updating the BIOS. That is, the BIOS can be updated only in the boot stage with the removable storage device, which is very inconvenient.

SUMMARY OF THE INVENTION

In view of the above problems, this disclosure provides an electronic device having updatable BIOS and BIOS updating method thereof which can be operated in different system modes to solve the problem in the prior art that the electronic device can not boot up properly due to the data corruption in the BIOS caused by viruses or error procedures or to the inability to load essential devices into the system via the BIOS as a result of the change of the processing unit in the motherboard of the electronic device.

This disclosure also solves the problem in the prior art that the removable storage device is required, for pre-downloading and storing the update data, to update the BIOS. Besides, this disclosure solves the defect that general electronic devices can update the BIOS only in the boot stage, thereby reducing the users' inconvenience.

This disclosure discloses an electronic device having updatable BIOS. The electronic device electrically connects to a server, in which update data is stored. The electronic device includes a BIOS, a network connection module and a switch. A BIOS program is stored in the BIOS, and a connecting program is stored in the network connection module for connecting to the server. The network connection module can switch to electronically connects to the server. When the electronic device is updating, the BIOS switches to electrically connect to the network connection module via the switch, the network connection module connects to the server by executing the connecting program, downloads the update data applying to the BIOS, and overwrites the update data to the BIOS to update the BIOS program.

Corresponding to the above electronic device, this disclosure further discloses a BIOS updating method, including the following steps: selecting a BIOS program; switching the BIOS to electrically connect to a network connection module via a switch; connecting the network connection module with a server by executing a connecting program; downloading the update data applying to the BIOS from the server via the network connection module; and overwriting, the update data to the BIOS and updating the BIOS program via the network connection module.

When updating the BIOS, the BIOS switches to electrically connect to the network connection module via the switch, and the network connection module connects to the server via the connecting program. The network connection module downloads the update data applying to the BIOS and overwrites the update data to the BIOS to update the BIOS program. Regardless of the data corruption in the BIOS caused by viruses or error procedures or of the inability to load essential devices into the system via the BIOS as a result of the change of the CPU in the motherboard of the electronic device, the updating of the BIOS can be completed by the above steps, making the electronic device can load the BIOS properly and maintaining the normal operation of the electronic device.

In addition, the updating of the BIOS of the electronic device is executed by the network connection module, which switches to electronically connect to the BIOS via the switch, connects to the server via the connecting program, downloads the update applying to the BIOS, and overwrites it to the BIOS. Therefore, no matter when the electronic device is in the operating, sleep, hibernation, or shutdown mode, the updating of the BIOS can be executed immediately, reducing the users' inconvenience and avoiding the defect of inability to operate properly due to the failed update in the operating mode.

These and other objects and advantages of this disclosure can be better appreciated from the following detailed description of the invention, taken in conjunction with the attached drawings.

BRIEF DESCRIPTION OF THE DRAWINGS

This disclosure will become more fully understood from the detailed description given herein below for illustration only, and thus not limitative of this disclosure, wherein.

DETAILED DESCRIPTION OF THE INVENTION

The electronic device having updatable BIOS and BIOS updating method thereof include three embodiments, which will be described respectively in the followings.

Figure 1:
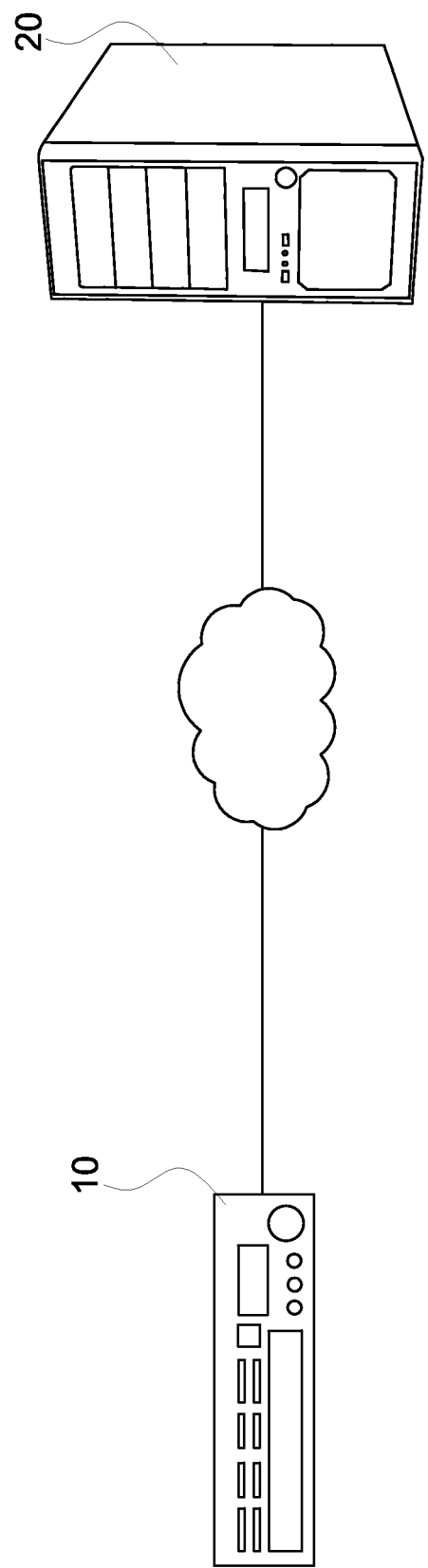
FIG. 1 is a schematic view of the electronic device and the server of this disclosure.
Figure 2:
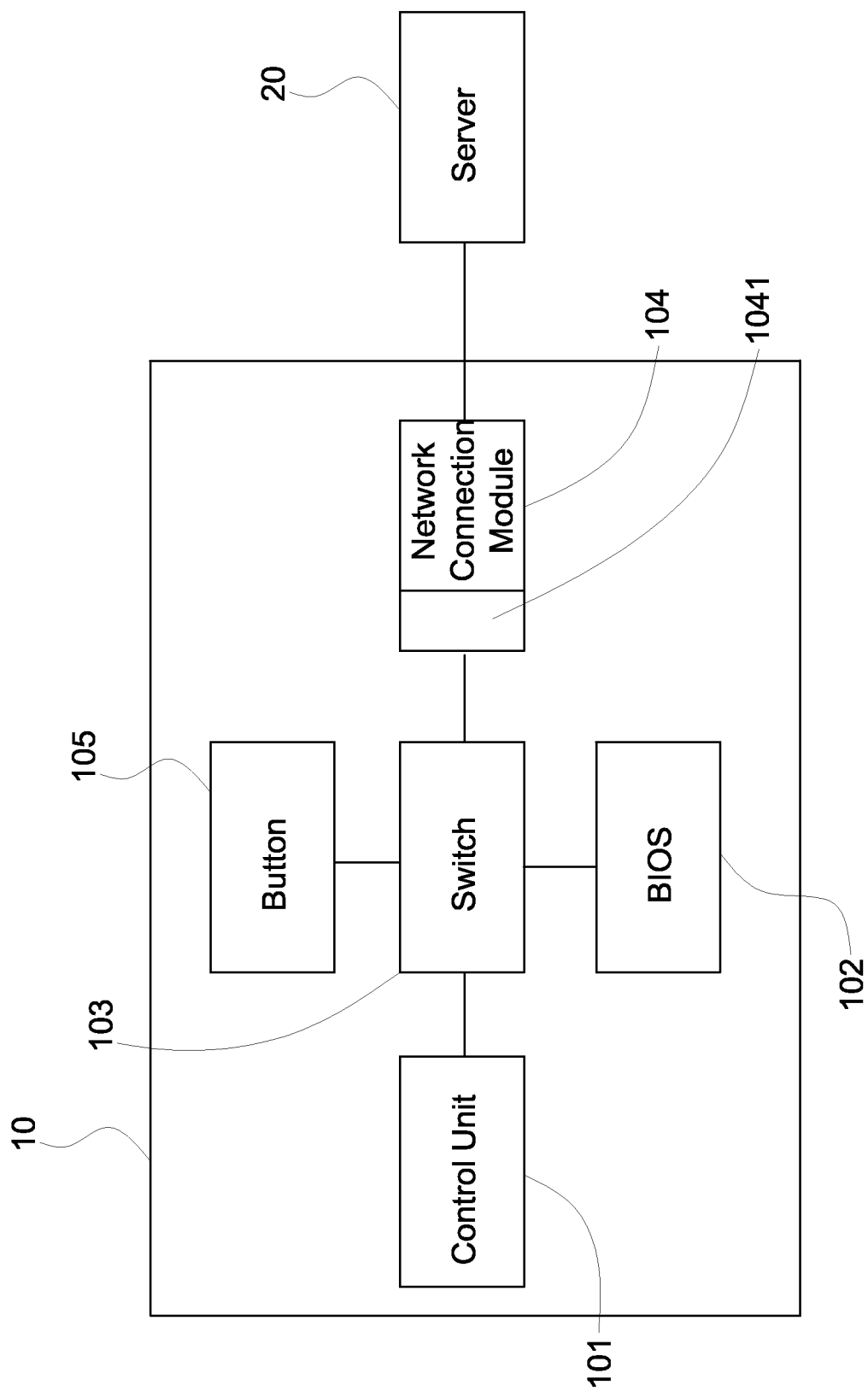
FIG. 2 is a block diagram of the electronic device and the server according to the first embodiment of this disclosure.

Refer to FIG. 1 and FIG. 2, an electronic device 10 having updatable BIOS electronically connects to a server 20. The server 20 can be but is not limited to a server for firmware update download supplied by the manufacturer or a mirror server for firmware update download supplied by a third party. The server 20 stores update data, which is a firmware update data applying to the BIOS in the electronic device 10. For example, firmware update data is a latest version of complete BIOS firmware program update data, or a latest version of partial BIOS firmware program update data. A person having ordinary skill in the art can adjust type of the update data according to the internet environment or system requirement, not limited as described herein.

In the first embodiment, the electronic device 10 includes a control unit 101, a BIOS 102, a switch 103, a network connection module 104, and a button 105. The control unit 101 is used to load and execute the operating system of the electronic device 10. Implementation of the control unit 101 is varied according to different electronic devices. For example, if the electronic device 10 is a desktop computer, the control unit can be a center processing unit or a graphic processing unit; or if the electronic device 10 is a TV set-top box, the control unit 101 can be a system-on-a-chip (SoC), not limited as described herein.

The BIOS 102 in the electronic device 10 stores a BIOS program. The switch 103 is electronically set up between the control unit 101, the BIOS 102, and the network connection module 104. The BIOS 102 is used to switch to electronically connect to the control unit 101 or to the network connection module 104 via the switch 103. The network connection module 104 electronically connects to the server 20.

The network connection module 104 stores a connecting program, the host name and the internet address of the server 20, and so on, for connecting the network connection module 104 with the server 20. In other words, by the connecting program and the associated server information inside the network connection module 104, the electronic device 101 can connect to the server 20 through the network connection module 104 without loading any programs through the control unit 101, executing the updating and maintenance of the BIOS. Besides, the network connection module 104 further has a Serial Peripheral Interface BUS (SPI BUS) 1041. The network connection module 104 overwrites the update data downloaded from the server 20 to the BIOS 102 via SPI BUS 1041 to complete the updating of the BIOS program.

In addition, the button 105 is set up in the electronic device 10, and the button 105 electronically connects to the switch 103. In the present embodiment, the button 105 is activated by a user to trigger the BIOS 102 to switch to electronically connect to the network connection module 104 by the switch 103, so that the connection with the server 20 is ready for the download, rewriting, and updating. It is noted that the updating of the BIOS 102 can be activated when the electronic device 10 is in the operating, sleep, hibernation, or shutdown mode. The button 105 is disposed in the housing of the electronic device 10, and the button 105 can be directly powered by the power supply, unrelated to control unit 101. Therefore, the user can update the BIOS 102, whether the electronic device 10 is operating.

Figure 3:
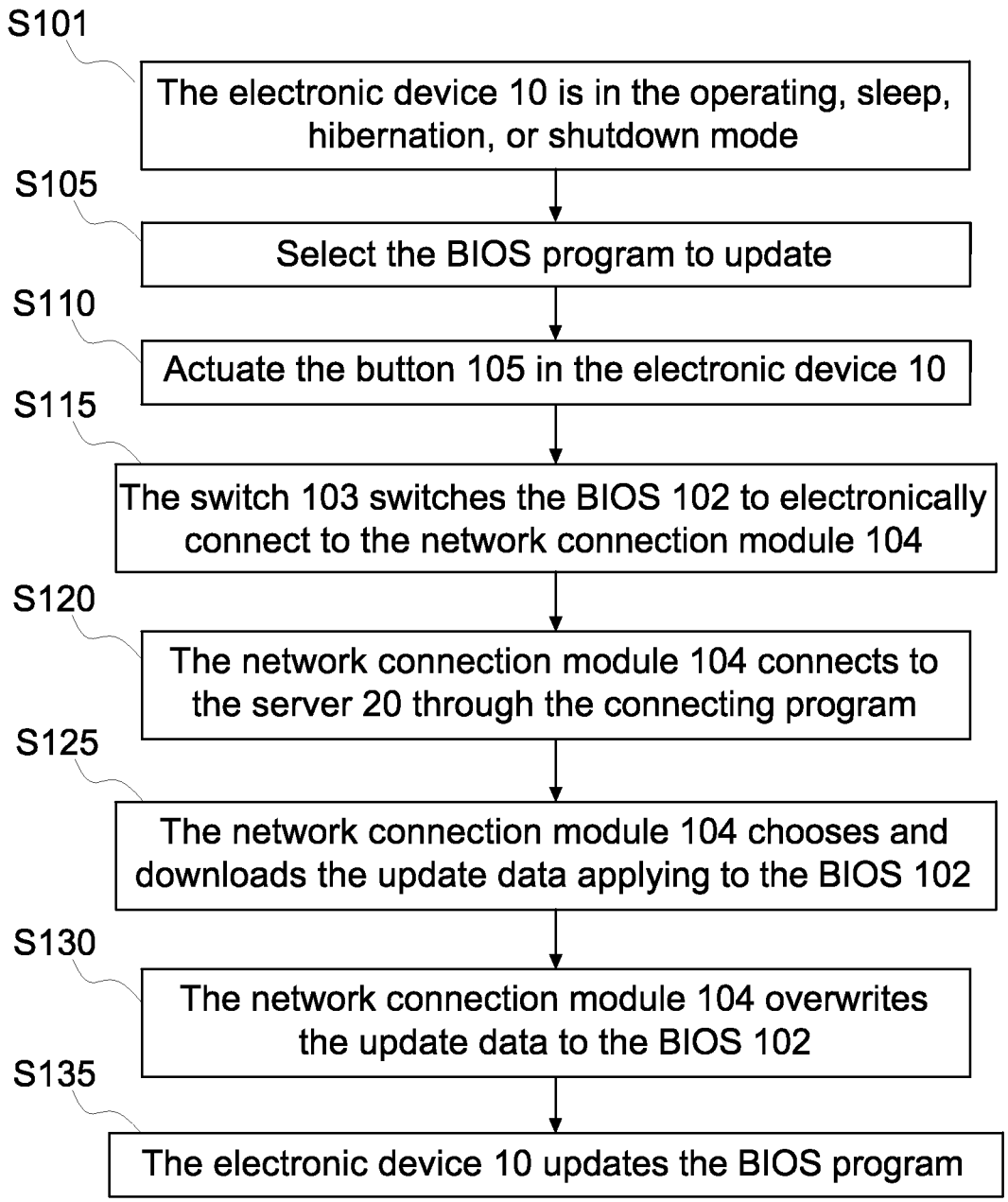
FIG. 3 is a flowchart of the first implementation of updating the BIOS according to the first and the third embodiment of this disclosure.

Please refer to FIG. 3, and refer to FIG. 1 and FIG. 2 as well. The updating of the BIOS 102 via the electronic device 10 further has two implementations, which will be described respectively in the followings.

In the first implementation, the user actuates the button 105 to trigger the updating of the BIOS 102 in the electronic device 10 when the electronic device 10 is in the operating, sleep, hibernation, or shutdown mode, that is, the updating of the BIOS 102 can be triggered via the button 105 when the power state is in S0 to S5.

Thus, if the user wants to update the BIOS 102 in the electronic device 10, first the electronic device 10 should be in the operating, sleep, hibernation, or shutdown mode (S101), and the BIOS 102 initially switches to electronically connect to the control unit 101 via the switch 103. When the user selects the BIOS program to update (S105), the user actuates the button 105 in the electronic device 10 (S110), so that the switch 103 switches the BIOS 102 to electronically connect to the network connection module 104 (S115).

Then, the network connection module 104 in the electronic device 10 connects to the server 20 that stores the update data through the connecting program and server information such as host name of the server (S120). The network connection module 104 automatically searches the update data applying to BIOS 102 in the server 20, and then the network connection module 104 chooses and downloads the update data applying to the BIOS 102 (S125). Then the network connection module 104 overwrites the update data to the BIOS 102 (S130), and the electronic device 10 updates the BIOS program (S135).

It is noted that in the steps S125 and S130, downloading the update data and overwriting the update data to the BIOS 102 can be carried out selectively through the two kinds of procedures in the followings:

Procedure 1: the network connection module 104 first downloads the update data applying to the BIOS 102 and then overwrites the update to the BIOS 102 after finishing the download to complete the update of the BIOS program in the electronic device 10. The advantage of the procedure is that updating and overwriting will be carried out only after the network connection module 104 confirms that the download completes, for avoiding incomplete update data download or the possibility that the BIOS updates fails because the internet disconnects during the downloading and overwriting, hence ensuring the stability of the BIOS 102.

Procedure 2: the network connection module 104 overwrites part of downloaded update data to the BIOS 102 while the network connection module 104 is downloading the update data. In other words, downloading the update data and overwriting the update data to the BIOS 102 is simultaneous. The advantage of the procedure is that the update time will be shorter because downloading and overwriting is simultaneous. Meanwhile, the system operation of the electronic device 10 will not be influenced by downloading and overwriting because they run automatically. Hence, the procedure is suitable to carry out while the electronic device 10 is in the operating mode.

A person having in the art can modify the procedure of downloading and overwriting described above according to the system requirement, not limited as described herein.

Through the above steps, the user can activate the button 105 to make the electronic device 10 connect to the server 20 via the network connection module 104 and download the suitable update data. Then the network connection module 104 overwrites the update data downloaded from the server 20 to the BIOS 102 via the SPI BUS 1041 to complete the update of the BIOS program. Because the updating of BIOS 102 in the present embodiment does not need to be executed by the control unit 101, the user can update the BIOS 102 when the electronic device 10 is in the sleep, hibernation, or shutdown mode, saving time and avoiding the risk of crash due to the failed update if the electronic device 10 updates while the electronic device 10 in the operation mode, hence enhancing users' convenience.

In the second implementation, the user controls the electronic device 10 to update the BIOS 102 via the control unit 101. Because the updating now is executed through control unit 101, the updating can be executed only when the electronic device 10 is in the operation mode and the control unit 101 is operating as well, that is, the power state is in S0.

Figure 4:
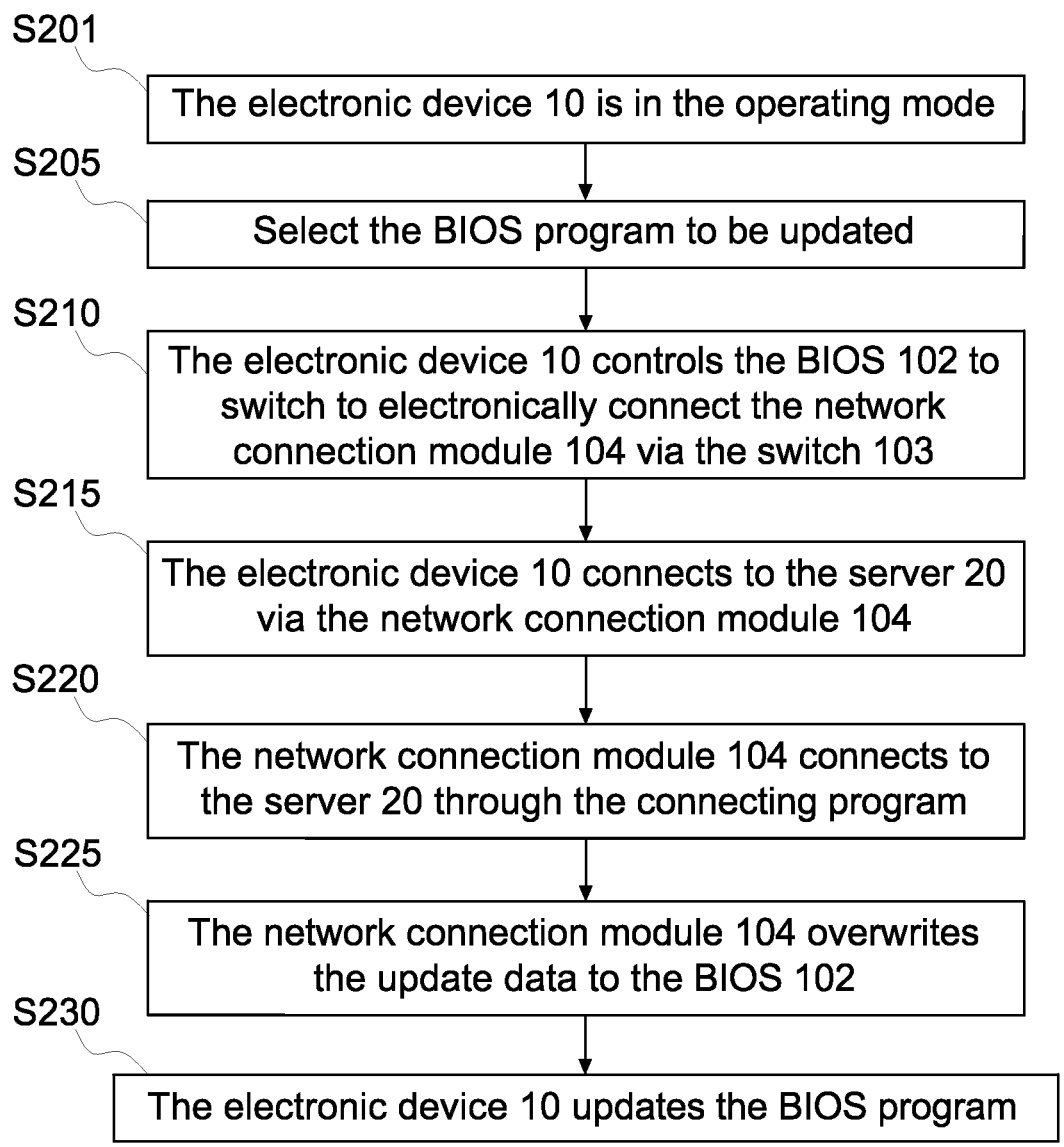
FIG. 4 is a flowchart of the second implementation of updating the BIOS according to the first to the third embodiment of this disclosure.

Please refer to FIG. 4, and refer to FIG. 1 and FIG. 2 as well. When the user controls the electronic device 10 to update the BIOS 102 via the control unit 101, the electronic device 10 is in the operating mode (S201). Then the user selects the BIOS program to be updated (S205). Through the control unit 101, the electronic device 10 controls the BIOS 102 to switch to electronically connect the network connection module 104 via the switch 103 (S210). The following steps, that is, the electronic device 10 connects to the server 20 via the network connection module 104 (S215), downloads the update data (S220), overwrites the update data to the BIOS 102 (S225), and updates the BIOS program (S230), are the same as S120 to S135 in the first implementation. Please refer to the previous paragraphs and the attached drawings there, and the inventor will not repeat here.

Therefore, in the first embodiment, the user can choose to use the first implementation, activating the button to trigger the electronic device 10 to update the BIOS 102, or to use the second implementation, controlling the electronic device 10 to update the BIOS 102 via the control unit 101, to complete the update.

Figure 5:
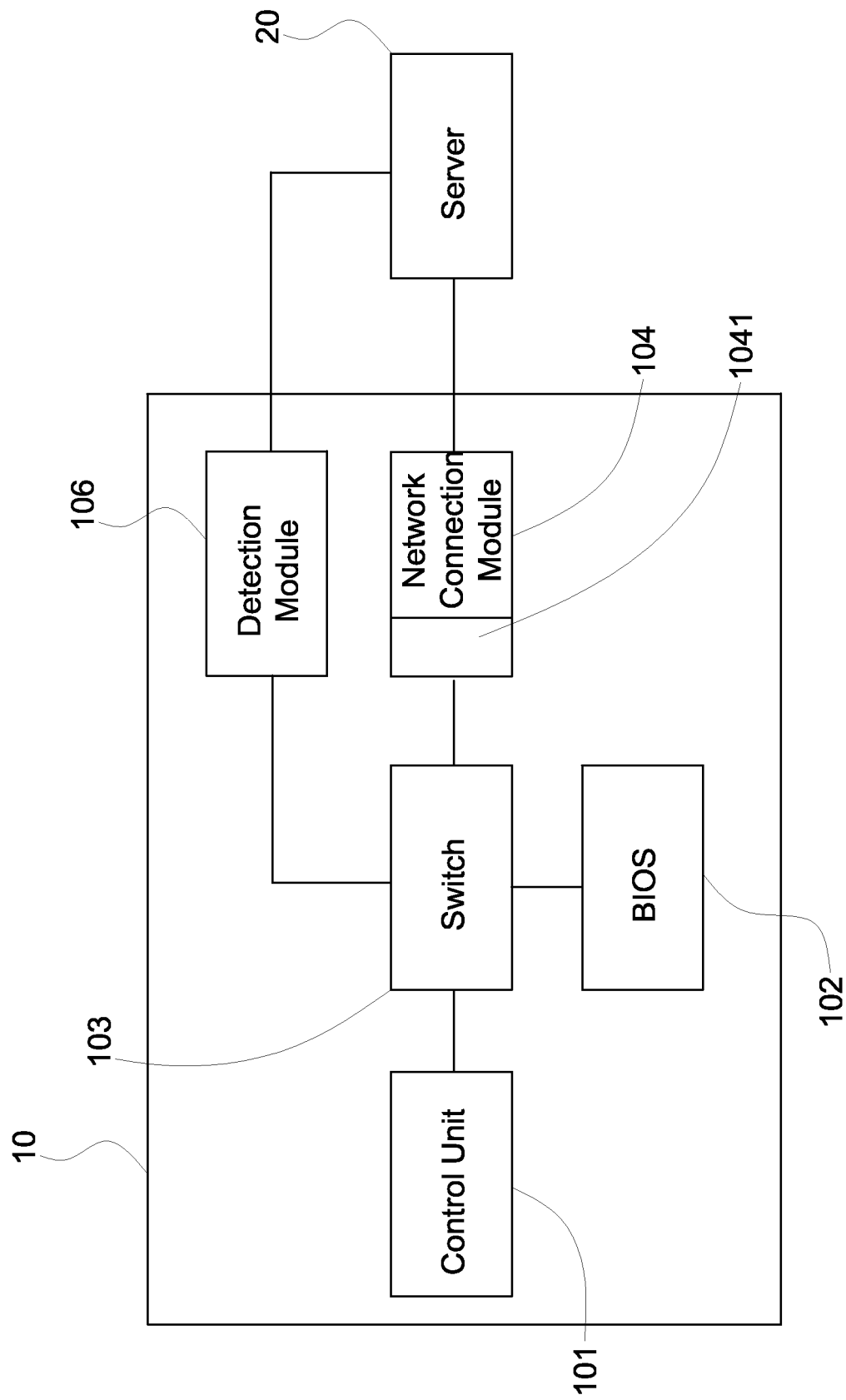
FIG. 5 is a block diagram of the electronic device and the server according to the second embodiment of this disclosure.

In the second embodiment, referring to FIG. 1 and FIG. 5, what this disclosure discloses is substantially the same as the first embodiment. The only difference is that the electronic device 10 replaces the button 105 by the detection module 106. The detection module 106 electronically connects to the server 20, and it will detect whether the server stores the update data applying to the BIOS 102 periodically. If the detection module 106 detects that the server 20 stores the update data applying to the BIOS 102, the detection module 106 will transmit a control signal to the switch 103, triggering the BIOS 102 to switch to electronically connect to the network connection module 104, for carrying out the following updating of the BIOS 102.

It is noted that for the convenience that the user can update the BIOS 102 when the electronic device 10 in this disclosure is in the operating, sleep, hibernation, or shutdown mode, the detection module 106 is similar to the button 105 in the first embodiment, which can be direct powered by the power supply of the electronic device 10, without the power control of the control unit 101. Therefore, the user can always start the updating of the BIOS 102, whether the electronic device 10 is operating.

Figure 6:
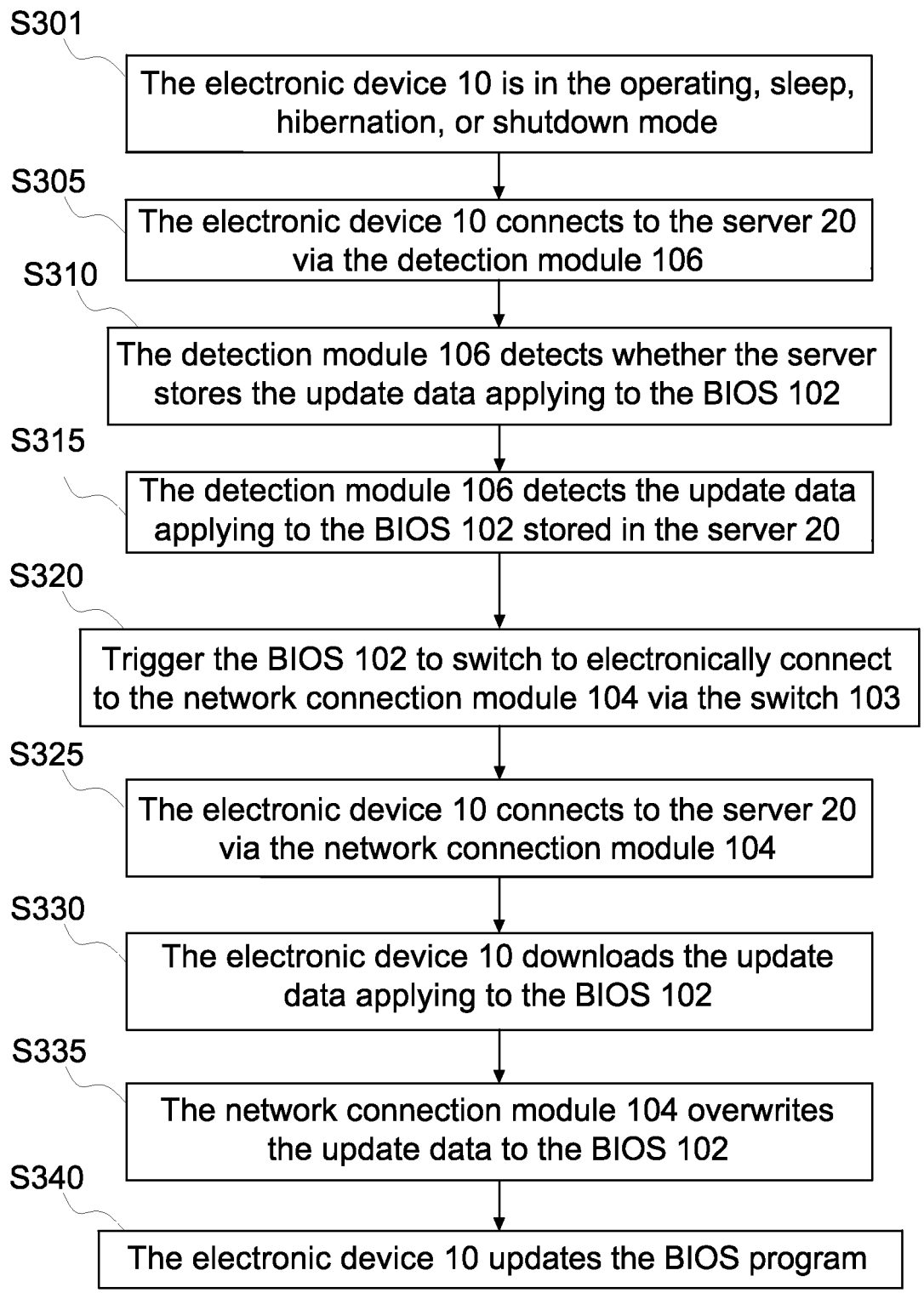
FIG. 6 is a flow diagram of the first implementation of updating the BIOS according to the second embodiment of this disclosure.

Please refer to FIG. 6, and refer to FIG. 1 and FIG. 5 as well. The way the user updates the BIOS 102 via the above electronic device 10 is similar to that in the first embodiment, also including two implementations, which are described in the followings.

In the first implementation, the detection module 106 in the electronic device 10 automatically detects once or periodically whether the server 20 stores the update data applying to the BIOS 102 to decide whether to update. And the updating of the BIOS 102 can be triggered via the detection module 106, without considering whether the control unit 101 is operating, when the electronic device 10 is in the operating, sleep, hibernation, or shutdown mode, that is, the power state is in S0 to S5.

When the electronic device 10 is in the operating, sleep, hibernation, or shutdown mode (S301), the electronic device 10 connects to the server 20 via the detection module 106 (S305), and then the detection module 106 detects whether the server stores the update data applying to the BIOS 102. When the detection module 106 detects the update data applying to the BIOS 102 stored in the server 20 (S310), the detection module 106 correspondingly transmit a control signal to the switch 103 (S315) to trigger the BIOS 102 to switch to electronically connect to the network connection module 104 via the switch 103 (S320). The following steps, that is, the electronic device 10 connects to the server 20 via the network connection module 104 (S325), downloads the update data applying to the BIOS 102 (S330), overwrites the update data to the BIOS 102 (S335), and updates the BIOS program (S340), are similar to those in the first implementation in the first embodiment (S120~S135), wherein downloading and overwriting is similar to those in the first implementation in the first embodiment, which can choose to be carried out by two kinds of procedure. Please refer to the paragraphs in the first embodiment, and the inventor will not repeat here.

In the second implementation, the electronic device 10 can also update the BIOS 102 via the control unit 101, and the process is similar to that in the second implementation of the first embodiment. Please refer to the paragraphs in the second implementation of the first embodiment, FIG. 1, FIG. 2, and FIG. 4, and the inventor will not repeat here.

It is worth noting that in the present implementation, the way that the electronic device 10 updates the BIOS 102 via the control unit 101 can be executed only when the electronic device 10 is in the operating mode and the control unit 102 is operating as well, that is, the power mode is in S0.

Therefore, in the second embodiment, the user can choose to use the first implementation, updating the BIOS 102 via the detection module 106, which detects whether the server 20 stores the suitable update data, or to use the second implementation, controlling the electronic device 10 to update the BIOS 102 via the control unit 101, to complete the update.

Figure 7:
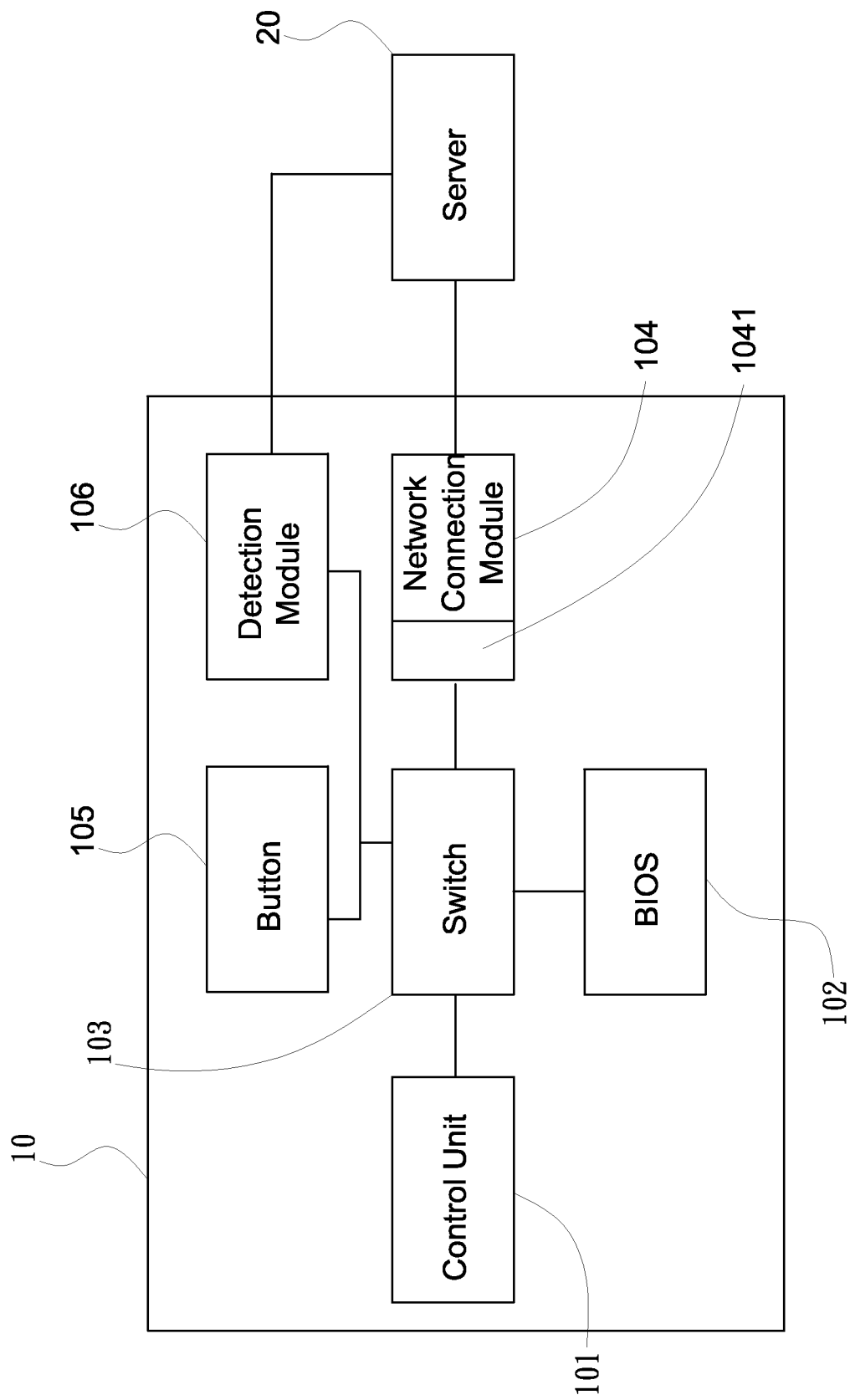
FIG. 7 is a component block diagram of the electronic device and the server according to the third embodiment of this disclosure.

In the third embodiment, referring to FIG. 1 and FIG. 7, the electronic device 10 disclosed here combines the button 105 in the first embodiment and the detection module 106 in the second embodiment, that is, in the present embodiment, the electronic device 10 has three implementation of updating the BIOS 102. In first implementation, the user actuates the button 105 to trigger the BIOS 102 to switch to electronically connect the network connection module 104 via the switch 103, ready for the following steps, which is similar to the first implementation in the first embodiment; in the second implementation, through the control unit 101, the user controls the BIOS 102 to switch to electronically connect to the network connection module 104 via the switch 103, ready for the following steps, which is similar to the second implementation in the first embodiment; in the third implementation, the detection module 106 detects whether the server 20 stores the suitable update to decide whether to update, which is similar to the first implementation in the second embodiment. For detailed steps, please refer to the paragraphs and the attached drawings in the first embodiment and second embodiment, and the inventor will not repeat here.

Therefore, in the third embodiment, the user can choose to use the first implementation, activating the button 105 to start the electronic device 10 to update the BIOS 102, or to use the second implementation, detecting whether the server 20 stores the suitable update data via the detection module 106 to execute the updating of the BIOS 102, or to use the third implementation, through the control unit 101, commending the electronic device 10 to update the BIOS 102. Therefore, the present embodiment has both advantages of the first and second embodiment, providing the users more ways to update the BIOS 102. Meanwhile, the present embodiment can adopt different ways to update the BIOS 102 corresponding to the operating, sleep, hibernation, or shutdown mode. Compared with the previous two embodiments, it obviously provides more operation convenience.

The electronic device in the above three embodiments of this disclosure can choose to use button, control unit, or detection module to trigger the BIOS switch to electronically connect to the network connection module via the switch. When the BIOS of the electronic device needs to update, the BIOS switches to electronically connect to the network connection module via the switch, and the network connection module connects to the server via the connecting program, downloads the update data applying to the BIOS, and overwrites it to the BIOS to complete the updating of the BIOS program.

Therefore, regardless of the data corruption in the BIOS caused by the viruses or error procedures or of the inability to load essential devices into the system via the BIOS as a result of the change of the processing unit in the motherboard of the electronic device, the updating of the BIOS can be completed by the above steps so that the electronic device can load the BIOS properly and maintains the normal operation.

In addition, the updating of the BIOS of the electronic device of the invention is executed by the network connection module, which electronically connects to the BIOS via the switch, connects to the server via the connecting program, downloads the update data applying to the BIOS, and overwrites it to the BIOS. Therefore, no matter when the electronic device is in the operating, sleep, hibernation, or shutdown mode, the updating of the BIOS can be executed immediately, reducing the users' inconvenience and avoiding the defect of inability to operate properly due to the failed update in the operating mode.

Though the embodiments of this disclosure are disclosed as described above, this is not to limit this disclosure. Those skilled in the art will recognize that the invention can be practiced with modification within the spirit and scope of the claim. It is therefore to be understood that this disclosure is not to be limited by the foregoing description but only by the appended claims.

What is claimed is:

1. A Basic Input and Output System (BIOS) updating method, applying to an electronic device having a BIOS, wherein the BIOS has a memory for storing a BIOS program, comprising the steps of:

connecting a detection module in the electronic device with the server;

detecting the update data, applying to the BIOS and stored in the server, by the detection module;

transmitting correspondingly a control signal to the switch from the detection module to trigger the BIOS to switch to electronically connect to the network connection module, wherein the network connection module stores a connecting program, the host name and the internet address of the server;

connecting the network connection module with a server via a connecting program;

downloading update data applying to the BIOS from the server via the network connection module;

overwriting part of the update data to the BIOS via the network connection module while the network connection module is downloading the update data, and updating the BIOS program;

activating a button of the electronic device to trigger the switch to electronically connect the BIOS and the network connection module, wherein the button is directly powered by the power supply of the electronic device; and triggering the BIOS by the button to switch to electronically connect to the network connection module via the switch.

2. The BIOS updating method of claim 1, further including the step of:

controlling the BIOS to run the updated BIOS program via a control unit in the electronic device.

3. The BIOS updating method of claim 1, wherein the electronic device updates the BIOS when the electronic device is in the operating, sleep, hibernation, or shutdown mode.

4. An electronic device having updatable Basic Input and Output System (BIOS), wherein the electronic device electronically connects to a server, and the server stores update data, comprising:

a BIOS, having a memory for storing a BIOS program;

a network connection module, electronically connecting to the server and storing a connecting program, the host name and the internet address of the server, for connecting to the server;

a switch, wherein the BIOS switches to electronically connect to the network connection module via the switch;

a control unit, electronically connected to the switch;

a button electronically connected to the switch, directly powered by the power supply of the electronic device, and unrelated to the control unit, wherein the button is activated to trigger the switch to electronically connect the BIOS and the network connection module, and the network connecting module connects to the server to download the update data applying to the BIOS, and overwrites part of the update data to the BIOS to update the BIOS program via the network connection module while the network connection module is downloading the update data; and a detection module, electronically connecting to the server;
wherein when the detection module detects that the server stores the update data applying to the BIOS, the detection module transmit a control signal to the switch, for triggering the BIOS to switch to electronically connect to the network connection module via the switch, and the network connection module connects to the server via the connecting program, downloads the update data applying to the BIOS, and overwrites part of the update data to the BIOS to update the BIOS program via the network connection module while the network connection module is downloading the update data.

5. The electronic device having updatable BIOS of claim 4, wherein the network connection module further includes a Serial Peripheral Interface BUS, and the network connection module overwrites the update to the BIOS via the Serial Peripheral Interface BUS.

6. The electronic device having updatable BIOS of claim 4, wherein the updating of the BIOS is carried out when the electronic device is in the operating, sleep, hibernation, or shutdown mode.

\* \* \* \* \*